United States Patent
Akaba et al.

[11] Patent Number: 6,109,647
[45] Date of Patent: Aug. 29, 2000

[54] SEAT-OCCUPANT RESTRAINING APPARATUS

[75] Inventors: Hiroshi Akaba; Hidetsugu Okazaki; Hidetoshi Utsumi, all of Wako, Japan

[73] Assignee: Honda Giken Kogyo Kabushiki Kaisha, Tokyo, Japan

[21] Appl. No.: 09/210,371

[22] Filed: Dec. 14, 1998

[30] Foreign Application Priority Data

| Dec. 15, 1997 | [JP] | Japan | 9-344954 |
| Dec. 15, 1997 | [JP] | Japan | 9-344956 |
| Dec. 26, 1997 | [JP] | Japan | 9-360868 |

[51] Int. Cl.$^7$ .............................. B60R 21/18; B60R 21/32
[52] U.S. Cl. ................................ 280/733; 280/735
[58] Field of Search ..................... 280/733, 734, 280/735

[56] References Cited

U.S. PATENT DOCUMENTS

| 5,673,932 | 10/1997 | Nitschke et al. | 280/735 |
| 5,767,766 | 6/1998 | Kwun | 280/735 |
| 5,941,336 | 8/1999 | Saito et al. | 280/735 |
| 5,967,548 | 10/1999 | Kozyreff | 280/735 |
| 5,990,569 | 11/1999 | Lundberg | 280/735 |
| 6,010,151 | 1/2000 | Honda | 280/735 |

FOREIGN PATENT DOCUMENTS

| 6-56001 | 3/1994 | Japan . |

*Primary Examiner*—Peter C. English
*Assistant Examiner*—Ruth Ilan
*Attorney, Agent, or Firm*—Armstrong, Westerman, Hattori, McLeland & Naughton

[57] ABSTRACT

A seat-occupant restraining apparatus for a vehicle is provided that includes both an air bag and air bag inflator and an air belt and air belt inflator. An ignition controller controls the ignition of both the air bag and air belt inflators. An acceleration sensor is included. The ignition controller calculates the magnitude of the shock of collision, based on input from the acceleration sensor at the time of a collision of the vehicle by integrating the acceleration over a preset time, and the magnitude of the shock is compared with a first and second threshold, both of which are stored in advance. If the calculated shock is less than the first threshold, the ignition controller does not output an ignition signal to either the air bag or the air belt. For shocks between the two threshold values, the air belt assembly is operated. For shocks greater than the second threshold, both the air belt and the air bag are activated.

1 Claim, 14 Drawing Sheets

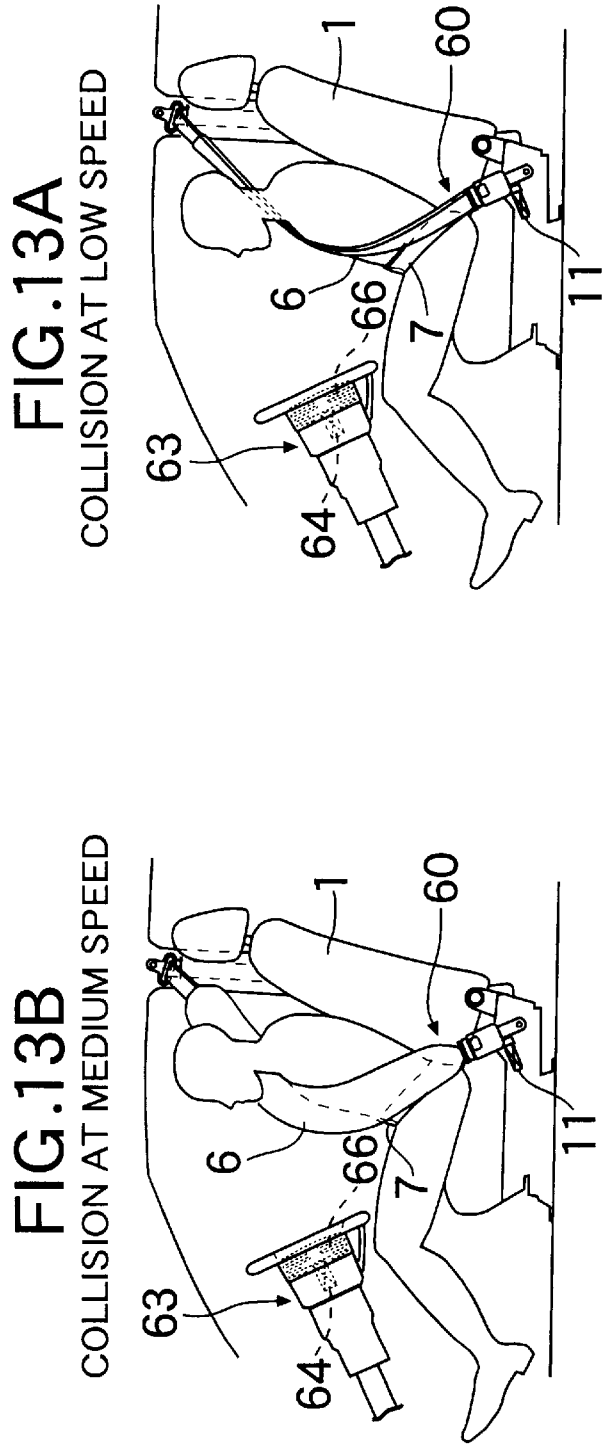
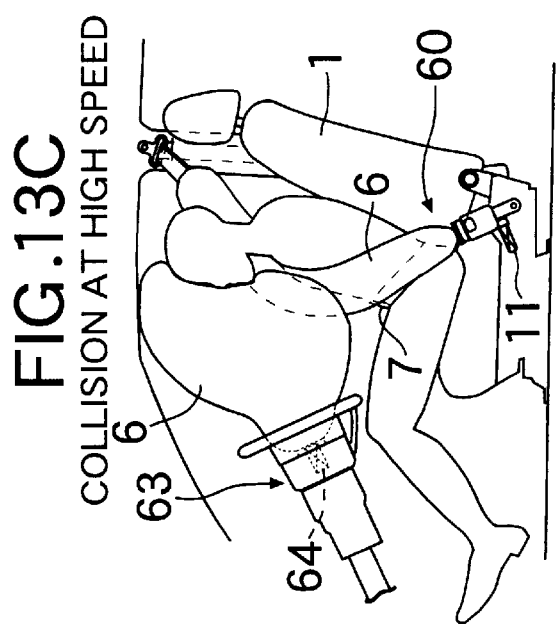

SEAT-OCCUPANT RESTRAINING APPARATUS

BACKGROUND OF THE INVENTION

1. Field of the Invention

The present invention relates to a seat-occupant restraining apparatus which expands a belt for restraining a seat occupant in a seat at the time of a collision of a vehicle, the belt being expanded with a high-pressure gas supplied from an inflator.

2. Description of the Related Art

An air belt assembly which includes a bag accommodated in a seat belt so that the bag is expanded to gently restrain a seat occupant at the time of a collision of a vehicle is already known, for example, from Japanese Patent Application Laid-Open No. 6-56001.

The bag of such an air belt assembly has a vent hole, and after the bag has been expanded, the internal pressure of the bag is adjusted to an appropriate value by discharging an extra high-pressure gas through the vent hole.

However, the vent hole, which is a simple opening formed in the bag and which automatically opens in the process of expansion of the folded bag, involves the problem that if the manner of the expansion of the folded bag varies, the timing or extent of opening of the vent hole does not become constant and it becomes difficult to discharge the extra high-pressure gas at an appropriate time.

A buckle assembly, to which a tongue device that is provided on a belt is connected, is pivotally supported on a seat base to be swingable forwardly and rearwardly, in order to compensate for a variation in the angle of the belt due to the forward or rearward position of a seat or the shape of the body of the seat occupant, when the seat occupant wears the seat belt assembly. For the same reason, in the air belt assembly as well, the buckle assembly needs to be supported pivotally to be swingable forwardly and rearwardly.

FIG. 14 shows the essential portion of a conventional air belt assembly. A buckle assembly 04, to which a tongue device 03 is connected, provided at one end of each of a shoulder belt 01 and a lap belt 02, is pivotally supported on a seat base 05 by a pivot pin 06 to be swingable forwardly and rearwardly. At the time of a collision of the vehicle, the high-pressure gas, produced by an inflator 07, integrally provided on the buckle assembly 04, is supplied to the shoulder belt 01 through the buckle assembly 04 and the tongue device 03, thereby expanding the shoulder belt 01 to gently restrain the seat occupant. In such a conventional air belt assembly, since the inflator 07 is integrally provided on the buckle assembly 04, as the buckle assembly 04 pivots about the pivot pin 06, the inflator 07 integrally pivots. This leads to the problem that limitations are put on the design because it is necessary to avoid the interference of the inflator 07 with other members.

The magnitudes of the shocks due to collisions of vehicles widely range from a small shock, for which a seat occupant can be fully restrained with only a normal seat belt, to a large shock, for which it is necessary to produce the largest possible restraining force. However, in a case where a seat occupant can be fully restrained, for example, merely by operating an air belt assembly without operating an air bag assembly, if both the air bag assembly and the air belt assembly are operated at the same time, the air bag assembly, which originally need not be used, will be wastefully used and the problem of an economic burden to a user will occur.

SUMMARY OF THE INVENTION

The present invention has been made in view of the above-described problems, and a first object of the present invention is to realize a stable air vent function superior to that of a vent hole, without providing a vent hole in the bag of an air belt assembly.

A second object of the present invention is to allow a swinging motion of a buckle assembly, while avoiding the interference of an inflator with other members in an air belt assembly.

A third object of the present invention is to avoid wasteful use of an air bag assembly and an air belt assembly, while ensuring necessary and sufficient restraining force, by controlling the operations of the air bag assembly and the air belt assembly according to the magnitude of shock applied to a vehicle.

To achieve the above-described first object, according to a first feature of the present invention, a seat-occupant restraining apparatus is provided which comprises a bag accommodated in a belt for restraining a seat occupant in a seat, and when a vehicle collides, expands the bag with a high-pressure gas produced by an inflator, wherein a relief valve, which opens according to an increase in an internal pressure of the bag, is provided in a gas passage for supplying the high-pressure gas from the inflator to the bag.

According to the above-described construction, if the inflator ignites at the time of a collision of the vehicle, a produced high-pressure gas is supplied to the bag accommodated in the belt and the belt is expanded so that the seat occupant can be gently restrained. If the bag completes expanding due to the high-pressure gas from the inflator and the internal pressure of the bag reaches the valve-opening pressure of the relief valve, the relief valve opens to discharge an extra high-pressure gas from the bag. Accordingly, not only is it possible to control the internal pressure of the bag to an appropriate value without causing variations, but it is also possible to freely set the gas-discharging direction of the relief valve and discharge the high-pressure gas in a direction away from the body of the seat occupant.

To achieve the first object described above, according to a second feature of the present invention, a seat-occupant restraining apparatus is provided which comprises a bag accommodated in a belt for restraining a seat occupant in a seat, and when a vehicle collides, expands the bag with a high-pressure gas produced by an inflator, wherein a solenoid valve, which opens with a time delay after an ignition of the inflator, is provided in a gas passage for supplying the high-pressure gas from the inflator to the bag.

According to the above-described construction, if the inflator ignites at the time of a collision of the vehicle, a produced high-pressure gas is supplied to the bag accommodated in the belt and the belt is expanded so that the seat occupant can be gently restrained. If a sufficient amount of time, which is necessary for the bag to complete expanding, passes after the inflator ignites, the solenoid valve opens to discharge an extra high-pressure gas from the bag. Accordingly, not only is it possible to control the internal pressure of the bag to an appropriate value without causing variations, but it is also possible to freely set the gas-discharging direction of a relief valve and discharge the high-pressure gas in a direction away from the body of the seat occupant.

To achieve the first object described above, according to a third feature of the present invention, a seat-occupant restraining apparatus is provided which comprises a bag accommodated in a belt for restraining a seat occupant in a seat, and when a vehicle collides, expands the bag with a high-pressure gas produced by an inflator, wherein a relief valve, which opens according to an increase in an internal pressure of the bag, is provided in a gas passage for discharging the high-pressure gas of the bag into the atmosphere.

According to the above-described construction, if the inflator ignites at the time of a collision of the vehicle, a produced high-pressure gas is supplied to the bag accommodated in the belt and the bag is expanded so that the seat occupant can be gently restrained. If the bag completes expanding due to the high-pressure gas from the inflator and the internal pressure of the bag reaches the valve-opening pressure of the relief valve, the relief valve opens to discharge an extra high-pressure gas from the bag. Accordingly, not only is it possible to control the internal pressure of the bag to an appropriate value without causing variations, but it is also possible to freely set the gas-discharging direction of the relief valve and discharge the high-pressure gas in a direction away from the body of the seat occupant.

To achieve the first object described above, according to a fourth feature of the present invention, a seat-occupant restraining apparatus is provided which comprises a bag accommodated in a belt for restraining a seat occupant in a seat, and when a vehicle collides, expands the bag with a high-pressure gas produced by an inflator, wherein a solenoid valve, which opens with a time delay after an ignition of the inflator, is provided in a gas passage for discharging the high-pressure gas of the bag into the atmosphere.

According to the above described construction, if the inflator ignites at the time of a collision of the vehicle, a produced high-pressure gas is supplied to the bag accommodated in the belt and the bag is expanded so that the seat occupant can be gently restrained. If a sufficient amount of time, which is necessary for the bag to complete expanding, passes after the inflator ignites, the solenoid valve opens to discharge an extra high-pressure gas from the bag. Accordingly, not only is it possible to control the internal pressure of the bag to an appropriate value without causing variations, but it is also possible to freely set the gas-discharging direction of a relief valve and discharge the high-pressure gas in a direction away from the body of the seat occupant.

To achieve the second object described above, according to a fifth feature of the present invention, a seat-occupant restraining apparatus is provided comprising: a belt in which a bag, which is expandable, is accommodated and which is supported at its one end on a fixed portion; a tongue device which is provided at the other end of the belt; a buckle assembly which is supported on the fixed portion to be swingable forwardly and rearwardly and to which the tongue device is connected; an inflator which is supported on the fixed portion for producing a high-pressure gas; and a flexible pipe which connects the inflator to the buckle assembly, wherein when a vehicle collides, the bag is expanded by supplying the high-pressure gas produced by the inflator to the bag through the flexible pipe, the buckle assembly, and the tongue device.

According to the above-described construction, when the seat occupant sits in a seat and connects the tongue device to the buckle assembly, even if the angle of the belt varies according to the forward or rearward position of the seat or the shape of the body of the seat occupant, the buckle assembly swings together with the tongue device and a variation in the angle of the belt can be absorbed. Even if the buckle assembly swings, the inflator, fixed to a fixed portion, does not swing and has no possibility of interfering with another member. In addition, the high-pressure gas can be smoothly supplied from the inflator to the buckle assembly via the flexible pipe.

To achieve the third object described above, according to a sixth feature of the present invention, a seat-occupant restraining apparatus is provided comprising: an air bag inflator, which produces a high-pressure gas; an air bag, which is expanded by the high-pressure gas produced by the air bag inflator and expands in front of a seat occupant sitting in a seat; an air belt inflator, which produces a high-pressure gas; an air belt, which is expanded by the high-pressure gas produced by the air belt inflator in the state of restraining the seat occupant in the seat; shock detecting means for detecting a shock of a collision of a vehicle; and control means for controlling an operation of the air bag inflator and an operation of the air belt inflator on the basis of an output of the shock detecting means, wherein if the shock detected by the shock detecting means is less than a first threshold the control means does not operate any one of the air bag inflator and the air belt inflator, wherein if the shock is not less than the first threshold and less than a second threshold greater than the first threshold, the control means does not operate the air bag inflator and operates the air belt inflator, and wherein if the shock is not less than the second threshold, the control means operates both the air bag inflator and the air belt inflator.

According to the above-described construction, if the shock of a collision of the vehicle is less than the first threshold and it is not necessary to strongly restrain the seat occupant, neither the air bag nor the air belt is expanded, and the seat occupant is restrained with only the air belt which functions as a mere seat belt. If the shock is not less than the first threshold and less than the second threshold and it is necessary to comparatively strongly restrain the seat occupant, only the air belt is expanded to produce the necessary and sufficient restraining force. If the shock is not less than the second threshold and it is necessary to strongly restrain the seat occupant, the air bag and the air belt are expanded to produce the maximum restraining force. In this manner, by inhibiting expansion of the air bag or the air belt when sufficient restraining force is obtained with other restraining means, it is possible to prevent wasteful operation of the air bag or the air belt to ease the economic burden on a user.

In the embodiment, the first threshold corresponds to the shock with which the vehicle collides head-on against a rigid wall at 16 km/h, while the second threshold corresponds to the shock with which the vehicle collides head-on against a rigid wall at 24 km/h. However, the values of these thresholds are a matter of design choice which can be appropriately varied.

The above and other objects, features and advantages of the present invention will become apparent from the following detailed description of the preferred embodiments, taken in conjunction with the accompanying drawing figures.

BRIEF DESCRIPTION OF THE DRAWING FIGURRES

FIG. 1 is a side view of a front seat portion of a vehicle;

FIG. 2 is a view taken in the direction of an arrow 2 of FIG. 1;

FIG. 3 is a perspective view of an air belt assembly; and

FIG. 4 is an enlarged cross-sectional view taken along a line 4—4 of FIG. 3.

FIG. 9 is a perspective view of an essential portion of the air belt assembly;

FIG. 10 is a cross-sectional view taken along a line 10—10 of FIG. 9; and

FIG. 11 is a cross-sectional view taken along a line 11—11 of FIG. 10.

FIGS. 12 and 13 illustrate a sixth embodiment of the present invention, as follows:

FIG. 12 is a side view of a front seat portion of a vehicle; and

FIGS. 13A to 13C are explanatory views of the operation of the sixth embodiment.

DESCRIPTION OF THE PREFERRED EMBODIMENTS

A first embodiment of the present invention will be described below with reference to the accompanying drawing figures.

Figure 1:
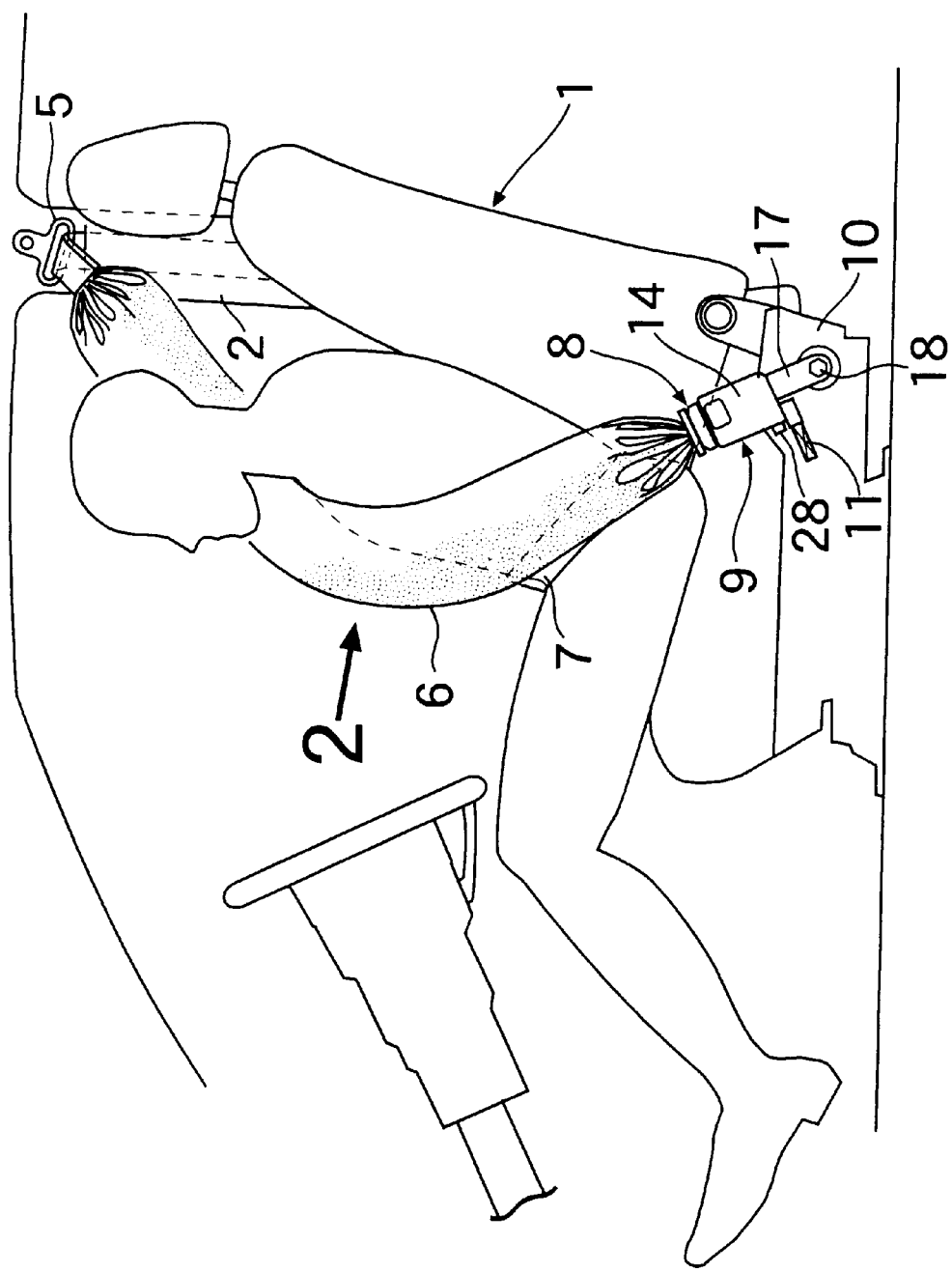
FIGS. 1 to 4 illustrate a first embodiment of the present invention, as follows.
Figure 2:
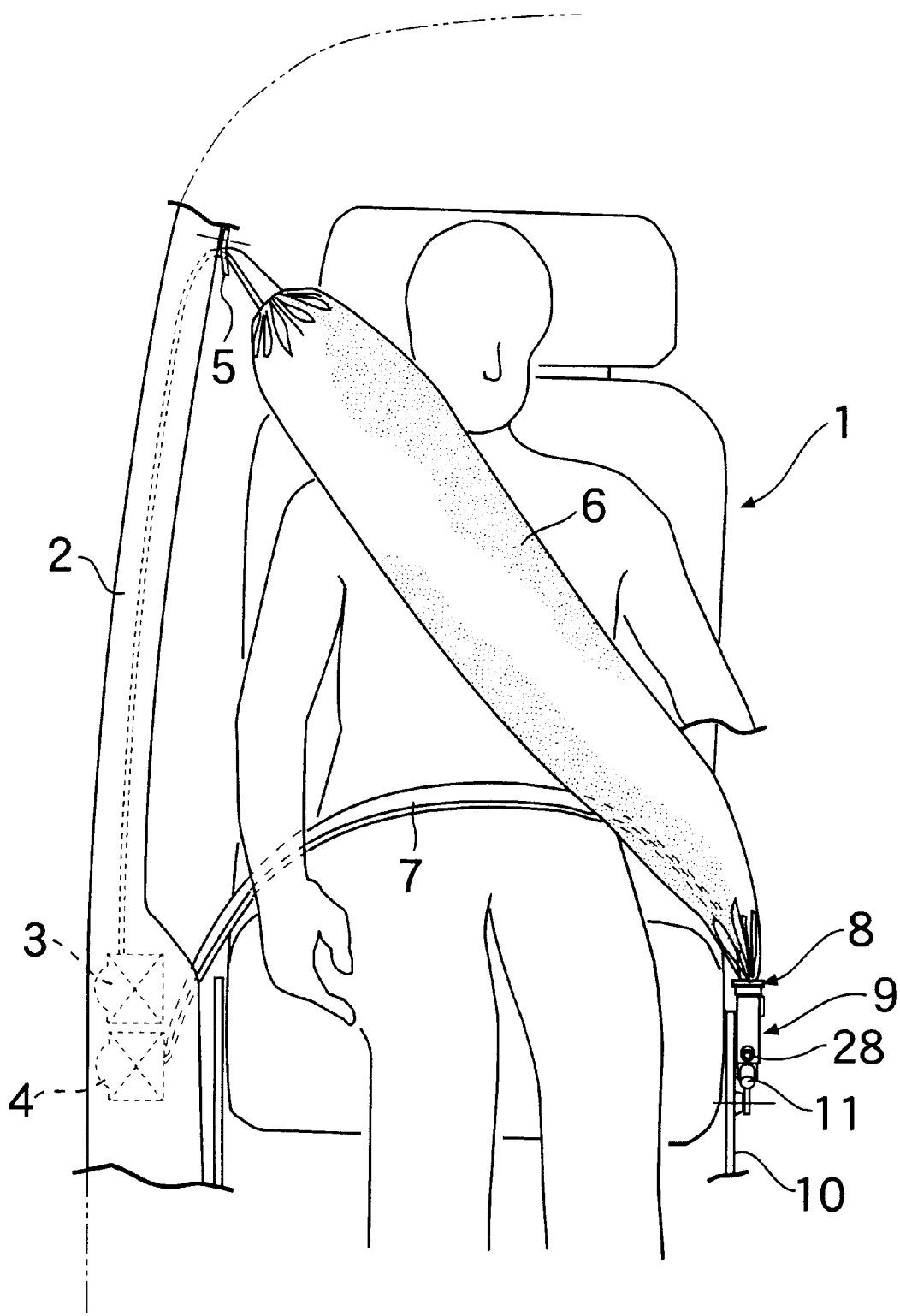
Figure 3:
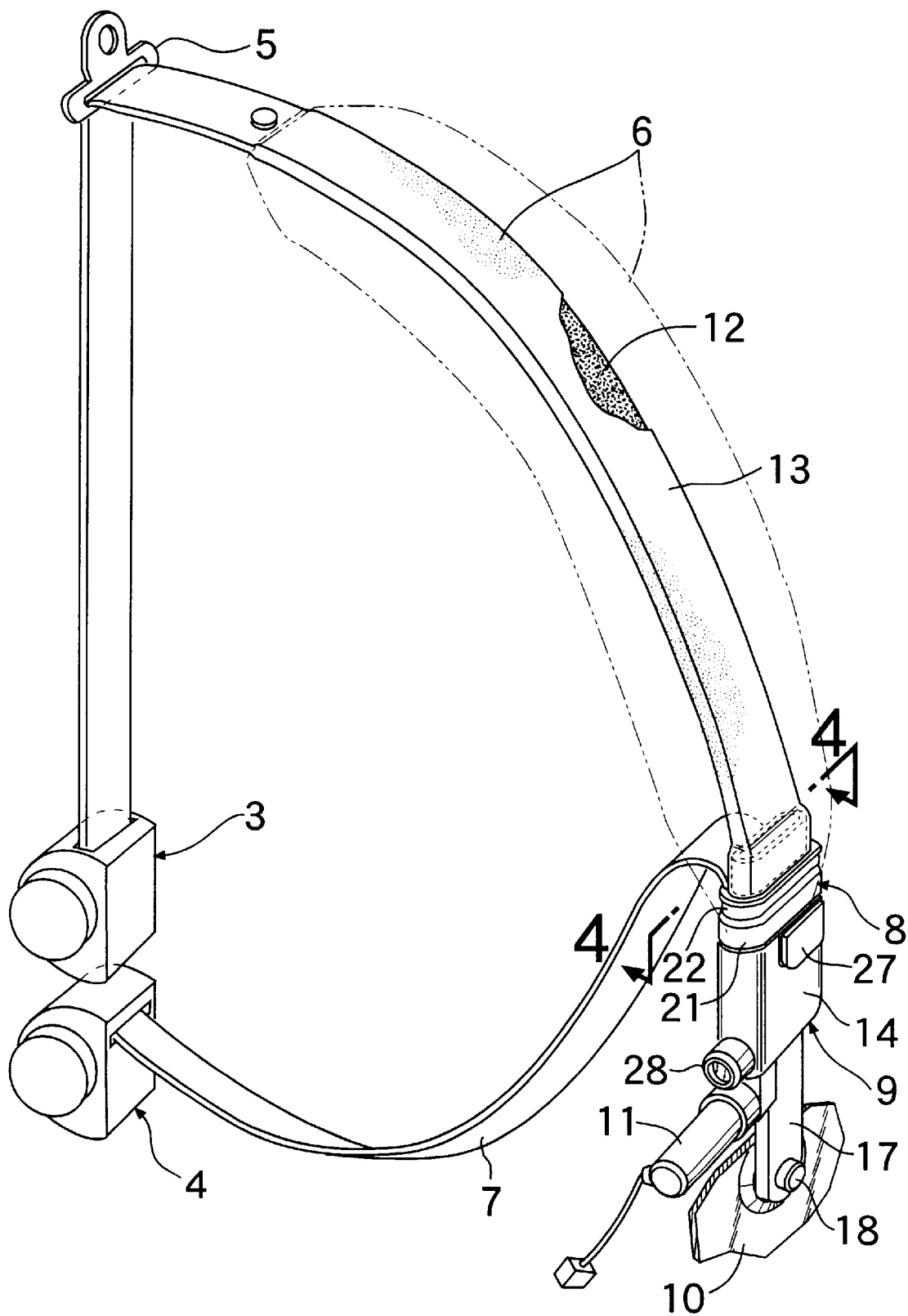

As shown in FIGS. 1 to 3, an air belt assembly for restraining a seat occupant (in this embodiment, a driver) in a front right seat 1 includes: a shoulder belt retractor 3, which is provided in a lower portion of a center pillar 2; a lap belt retractor 4, which is provided below the shoulder belt retractor 3; a shoulder belt 6, which is drawn from the shoulder belt retractor 3 to extend via a slip guide 5 provided in an upper portion of the center pillar 2; a lap belt 7, which is drawn from the lap belt retractor 4; a tongue device 8, which is fixed to an end of each of the shoulder belt 6 and the lap belt 7; a buckle assembly 9, which is fixed to a seat base 10 made from a seat frame or a seat rail and to which the tongue device 8 is connected; and an inflator 11, which is integrally provided on the buckle assembly 9.

The shoulder belt retractor 3 and the lap belt retractor 4, which are of known types, serve to drawably wind the shoulder belt 6 and the lap belt 7, respectively. During a normal state in which an acceleration sensor (not shown) is not detecting an acceleration of not less than a predetermined value, the shoulder belt retractor 3 and the lap belt retractor 4 drawably unlock both belts 6 and 7 to allow movement of the body of the seat occupant, and if the acceleration sensor detects an acceleration of not less than the predetermined value at the time of a collision of the vehicle, the shoulder belt retractor 3 and the lap belt retractor 4 nondrawably lock both belts 6 and 7 to restrain the seat occupant. When the acceleration sensor detects an acceleration of not less than the predetermined value, the inflator 11, of a known type, ignites and produces a high-pressure gas due to the combustion of a propellant.

The lap belt 7 is made from a plain weave belt of synthetic fiber. As shown in FIG. 3, the portion of the shoulder belt 6, which is to be brought into contact with the chest of the seat occupant, includes: a rubber-made bag 12, which is formed in a tubular shape; and a cover 13, which covers the outside of the bag 12. Each of the bag 12 and the cover 13 normally has a flat strip shape, but if the high-pressure gas is supplied from the inflator 11 to the bag 12, the bag 12 is expanded into the state shown in each of FIGS. 1 and 2 and gently restrains the seat occupant. When the cover 13, made of warp knit, is expanded in the radial direction with the expansion of the bag 12, the cover 13 shrinks in the longitudinal direction by the corresponding amount to produce an initial tension in the shoulder belt 6.

Figure 4:
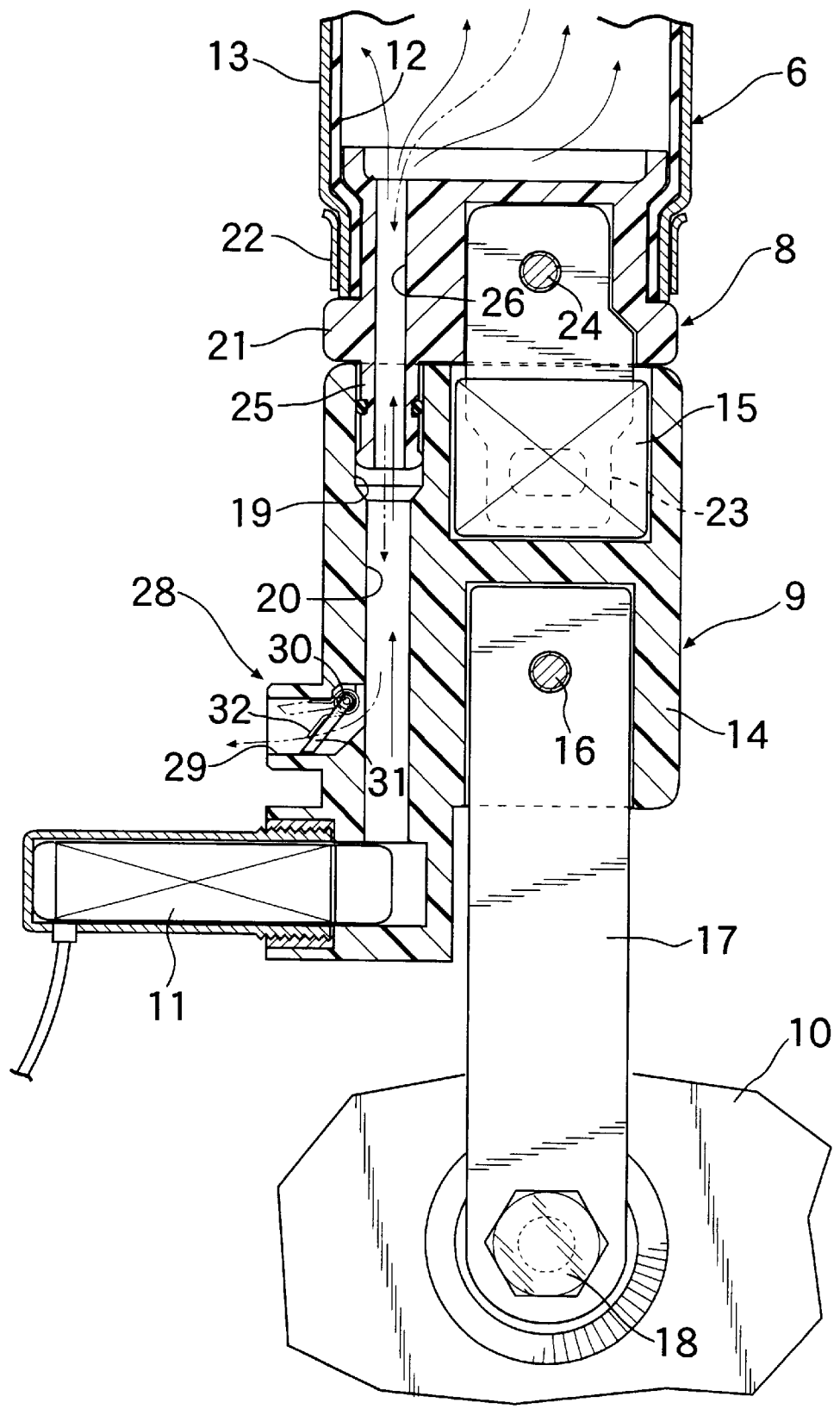

Referring to FIG. 4 as well, the inflator 11 is fixed to a lower portion of a buckle housing 14 which constitutes the body portion of the buckle assembly 9, and a buckle 15 is fixed to an upper portion of the buckle housing 14. An anchor member 17, which is fixed to the buckle housing 14 at its upper end by a bolt 16, is supported on the seat base 10 to be swingable forwardly and rearwardly by a pivot pin 18. The inflator 11 and a connection port 19, which is opened in an upper wall of the buckle housing 14, communicate with each other by a gas passage 20, formed in the inside of the buckle housing 14.

The bag 12 and the cover 13 of the shoulder belt 6, which are fitted on an upper peripheral surface of a tongue housing 21 of the tongue device 8, as well as the lap belt 7, which is fitted to overlap the bag 12 and the cover 13, are fixed to one another by being fastened by a ring-shaped holder 22. A tongue 23, whose upper half is embedded in the inside of the tongue housing 21, is fixed to the tongue housing 21 by a bolt 24 which is inserted through a holder 22, the lap belt 7, the cover 13, and the bag 12. A connection pipe 25, which can be inserted into the connection port 19 of the buckle housing 14, projects from the lower surface of the tongue housing 21. A gas passage 26, which allows the connection port 19 to communicate with the inside of the bag 12, is formed in the tongue housing 21 and the connection pipe 25. A release button 27, for separating the tongue 23 from the buckle 15, is provided on the buckle housing 14.

The bag 12 of the shoulder belt 6 does not have a vent hole through which to discharge an extra high-pressure gas, but instead, a relief valve 28 is integrally provided in an intermediate portion of the gas passage 20 of the buckle housing 14. The relief valve 28 includes: a gas discharge hole 29, which allows the gas passage 20 to communicate with atmospheric air; a valve disc 31, which is pivotally supported by a pin 30, and which opens or closes the gas discharge hole 29; and a spring 32, which urges the valve disc 31 in the valve-closing direction.

The operation of the first embodiment of the present invention having the above-described construction will be described below.

As shown in FIG. 4, if the seat occupant connects the tongue 23, of the tongue device 8, to the buckle 15 of the buckle assembly 9, in order to strap on the air belt assembly, the connection pipe 25 of the tongue device 8 is inserted into the connection port 19 of the buckle assembly 9.

If the acceleration sensor detects an acceleration of not less than the predetermined value at the time of a collision of the vehicle, the inflator 11 ignites to produce a high-pressure gas, and the produced high-pressure gas is supplied to the bag 12 of the shoulder belt 6 through the gas passage 20 of the buckle housing 14 and the gas passage 26 of the tongue housing 21, thereby expanding the bag 12. As the shoulder belt 6 is expanded in this manner, the area of contact with the chest of the seat occupant increases compared with the shoulder belt 6 which has not yet expanded, so that the seat occupant can be restrained far more gently.

The relief valve 28 is held in a closed state in the process of expansion of the bag 12, but if the bag 12 completes expanding and its internal pressure exceeds the valve-opening pressure of the relief valve 28, the valve disc 31 swings against the urging force of the spring 32 and the extra high-pressure gas produced by the inflator 11 is discharged from the gas passage 20 through the relief valve 28. In addition, since the expanded bag 12 is compressed by the pressure of the seat occupant who moves forwardly because of his/her own inertia, the relief valve 28 opens to discharge the gas from the bag 12, whereby it is possible to increase a shock absorption effect to a further extent.

In this manner, since the gas is discharged by using the relief valve 28 instead of being discharged through a vent hole in the bag 12, there is no risk that the vent hole is covered to hinder smooth discharge of the gas or the gas is discharged toward the seat occupant. Accordingly, it is possible to expand the bag 12 at a constant internal pressure at any time, and it is also possible to reliably discharge the gas away from the body of the seat occupant.

Figure 5:
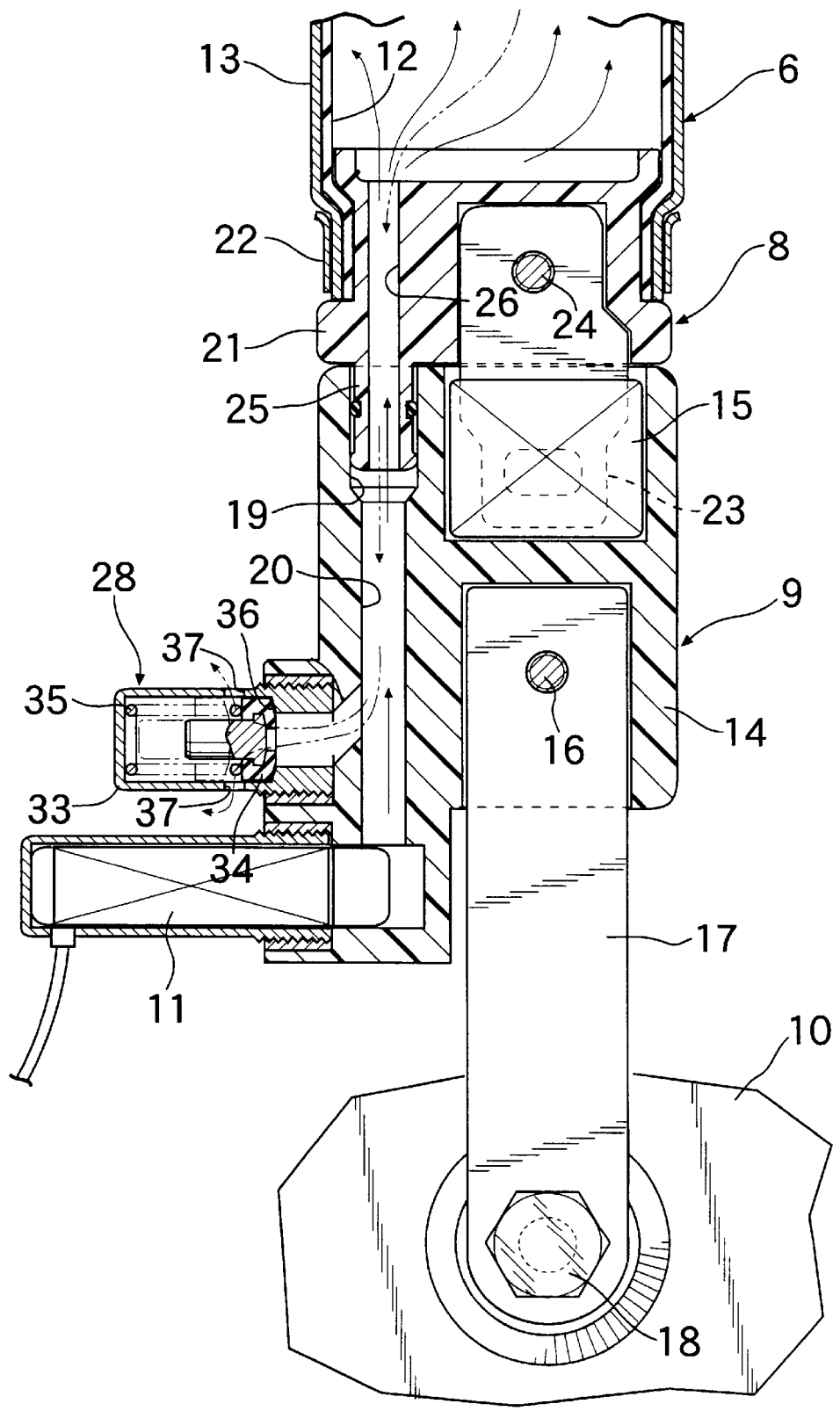
FIG. 5 is a view similar to FIG. 4, but showing a modification of the first embodiment.

FIG. 5 shows a modification of the first embodiment, and the modification differs from the first embodiment in the structure of the relief valve 28.

Specifically, the relief valve 28 of the modification is detachably secured to the buckle housing 14, and a valve disc 34, which is slidably supported in the inside of a valve housing 33, is brought into abutment with a valve seat 36 provided in the valve housing 33, by the elastic force of a spring 35. Accordingly, if the internal pressure of the bag 12, which is expanded by the high-pressure gas supplied from the inflator 11, exceeds the predetermined value, the valve disc 34 slides against the elastic force of the spring 35 and the gas passage 20 is allowed to communicate with openings 37, formed in the valve housing 33, thereby discharging the gas. In accordance with this modification, since the relief valve 28 is detachably secured to the buckle housing 14, production and maintenance are facilitated, as compared with the case in which the relief valve 28 is integrally provided on the buckle housing 14.

Figure 6:
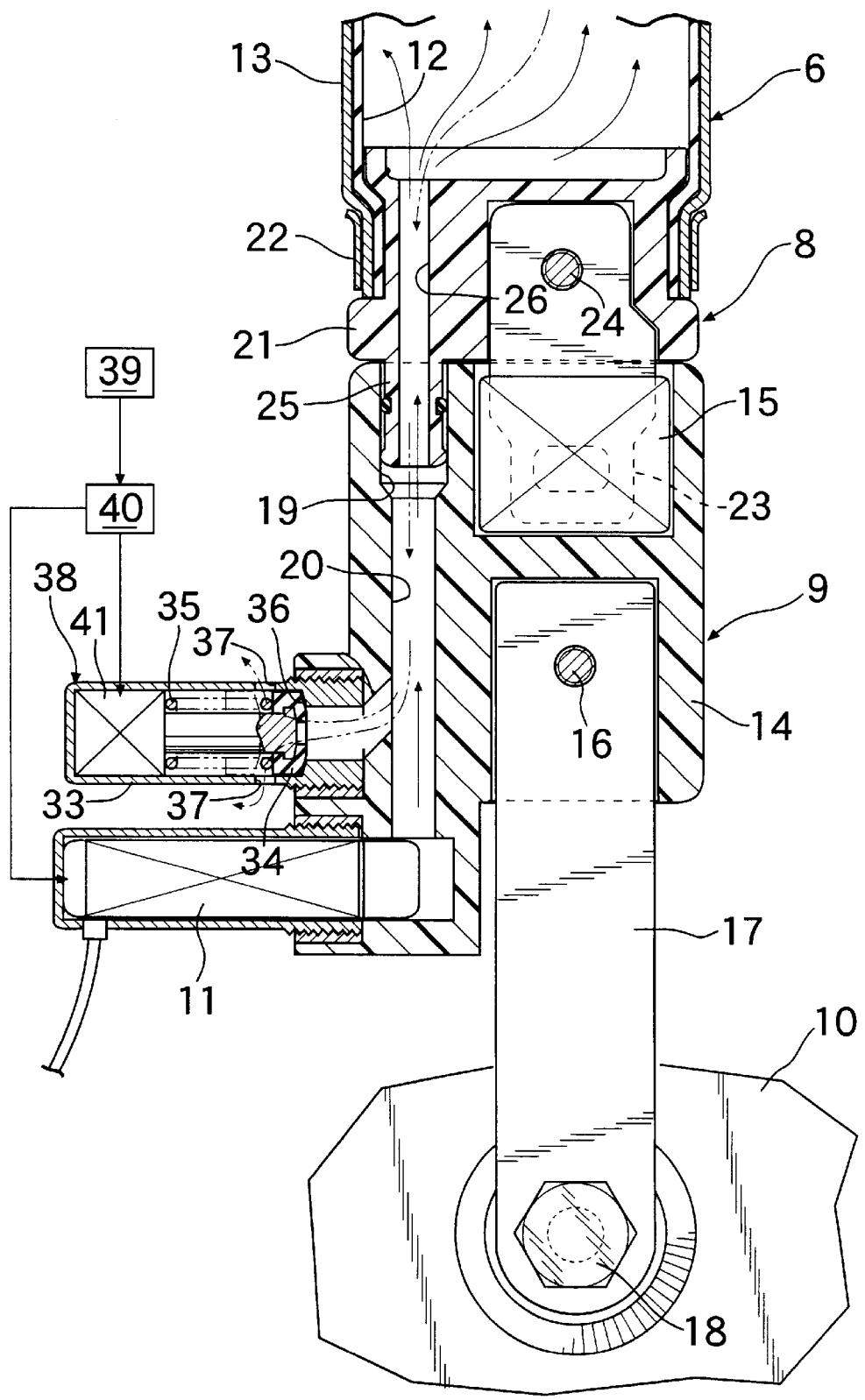
FIG. 6 is a view similar to FIG. 4, but showing a second embodiment of the present invention.

FIG. 6 shows a second embodiment of the present invention, in which the relief valve 28 of the above-described modification is replaced with a solenoid valve 38. The solenoid valve 38 is connected to a controller 40, which controls the ignition of the inflator 11, on the basis of the output of an acceleration sensor 39. If the acceleration sensor 39 detects the shock of a collision of the vehicle, the controller 40 outputs an ignition signal to the inflator 11 and the bag 12 is expanded by the high-pressure gas produced by the inflator 11. When the controller 40 outputs a valve-opening signal to the solenoid valve 38 slightly later than the ignition signal, a solenoid 41, of the solenoid valve 38, drives the valve disc 34 to move it away from the valve seat 36, thereby allowing the gas passage 20 to communicate with the openings 37, and open the solenoid valve 38. The time at which the solenoid valve 38 opens is set to coincide with the time at which the bag 12 completes expanding, and the extra high-pressure gas produced by the inflator 11 is discharged through the solenoid valve 38, which has been opened.

In accordance with the second embodiment as well, similarly to the above-described first embodiment, not only is it possible to expand the bag 12 at a stable constant internal pressure, but it is also possible to reliably discharge the gas away from the body of the seat occupant.

Figure 7:
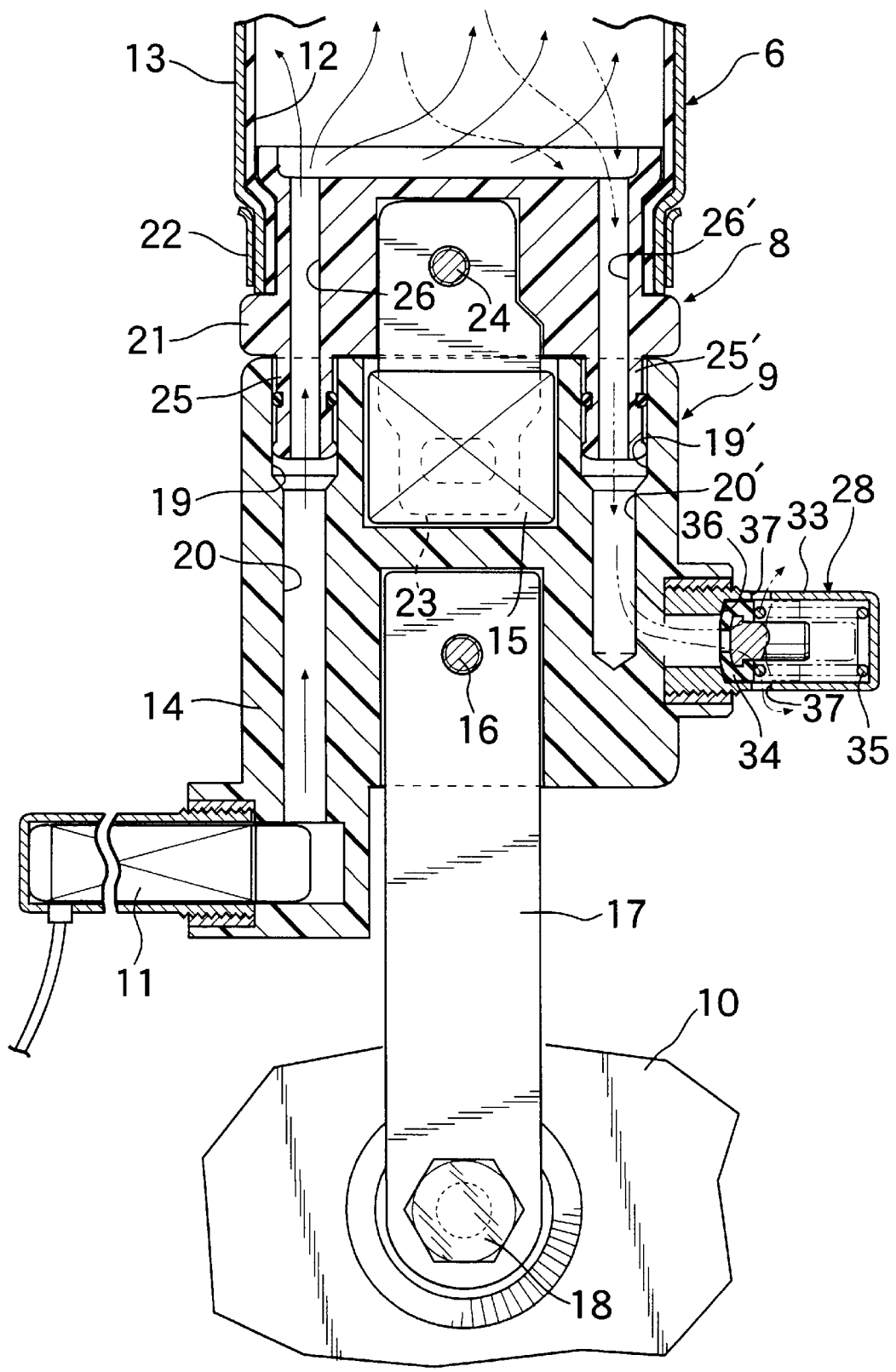
FIG. 7 is a view similar to FIG. 4, but showing a third embodiment of the present invention.

FIG. 7 shows a third embodiment of the present invention, and the relief valve 28, of the modification of the first embodiment, shown in FIG. 5, is provided at a different position. Specifically, the tongue housing 21 has a connection pipe 25' and a gas passage 26' for discharging the high-pressure gas, at positions symmetrical to the connection pipe 25 and the gas passage 26 for supplying the high-pressure gas, and the buckle housing 14 has a connection port 19' and a gas passage 20' for discharging the high-pressure gas, at positions symmetrical to the connection port 19 and the gas passage 20 for supplying the high-pressure gas. The relief valve 28, which is identical in structure to that of the above-described modification, is provided at the downstream end of the gas passage 20' of the buckle housing 14. With the third embodiment as well, it is possible to achieve effects and advantages similar to those of the above-described first embodiment and the modification.

Figure 8:
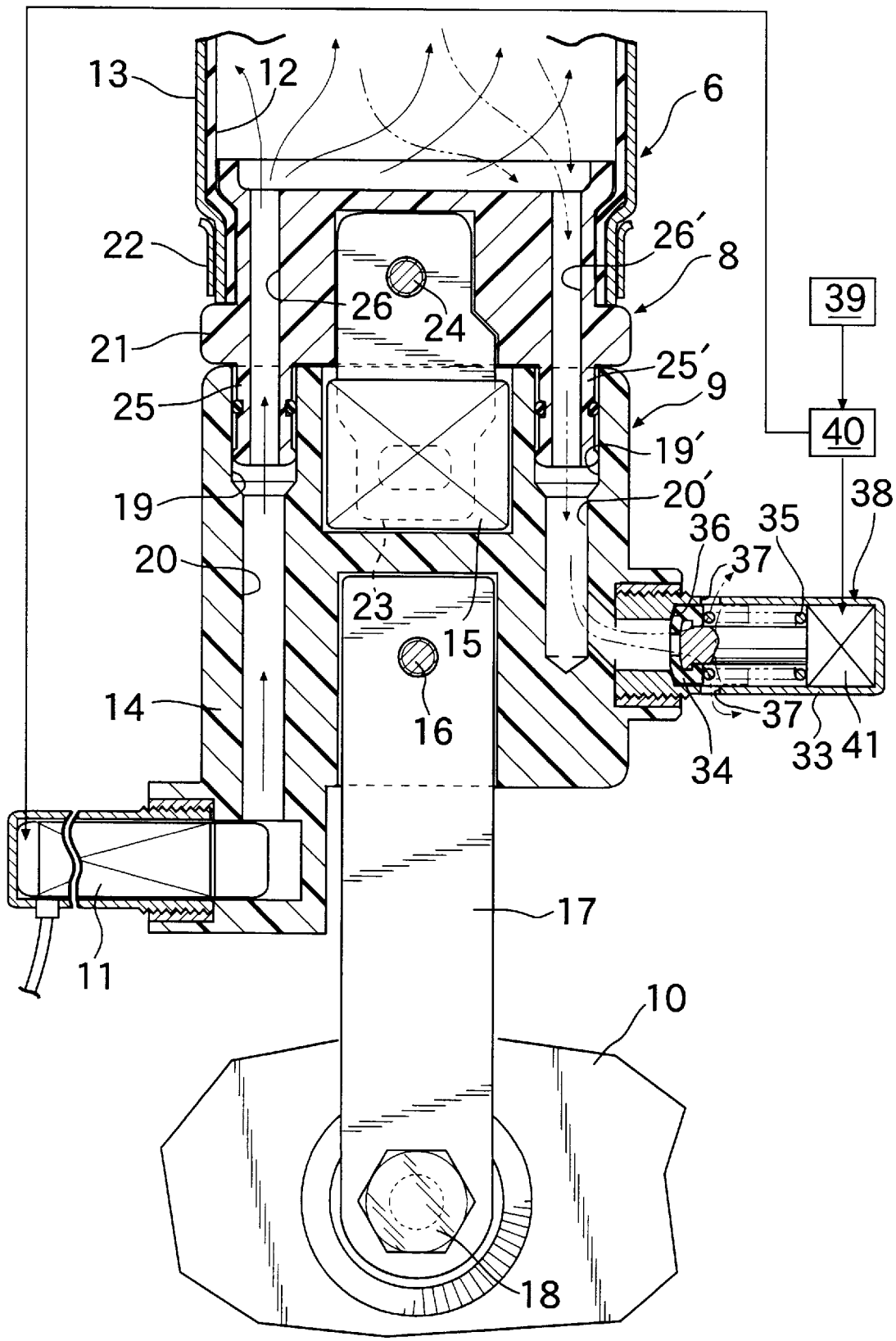
FIG. 8 is a view similar to FIG. 4, but showing a fourth embodiment of the present invention.

FIG. 8 shows a fourth embodiment of the present invention, and the solenoid valve 38, of the second embodiment, shown in FIG. 6, is provided at a different position. Specifically, similarly to the third embodiment shown in FIG. 7, the tongue housing 21 has the connection pipe 25' and the gas passage 26' for discharging the high-pressure gas, and the buckle housing 14 has the connection port 19' and the gas passage 20' for discharging the high-pressure gas. The solenoid valve 38, which is identical in structure to that of the second embodiment shown in FIG. 6, is provided at the downstream end of the gas passage 20' of the buckle housing 14. With the fourth embodiment as well, it is possible to achieve effects and advantages similar to those of the above-described second embodiment.

In any of the above-described first to fourth embodiments, a belt to be expanded is not limited to the shoulder belt 6, and the lap belt 7 may also be expanded. Although, in each of the first embodiment and the modification thereof as well as the third embodiment, the relief valve 28 is provided on the buckle assembly 9, the relief valve 28 may also be provided on the tongue device 8.

Figure 9:
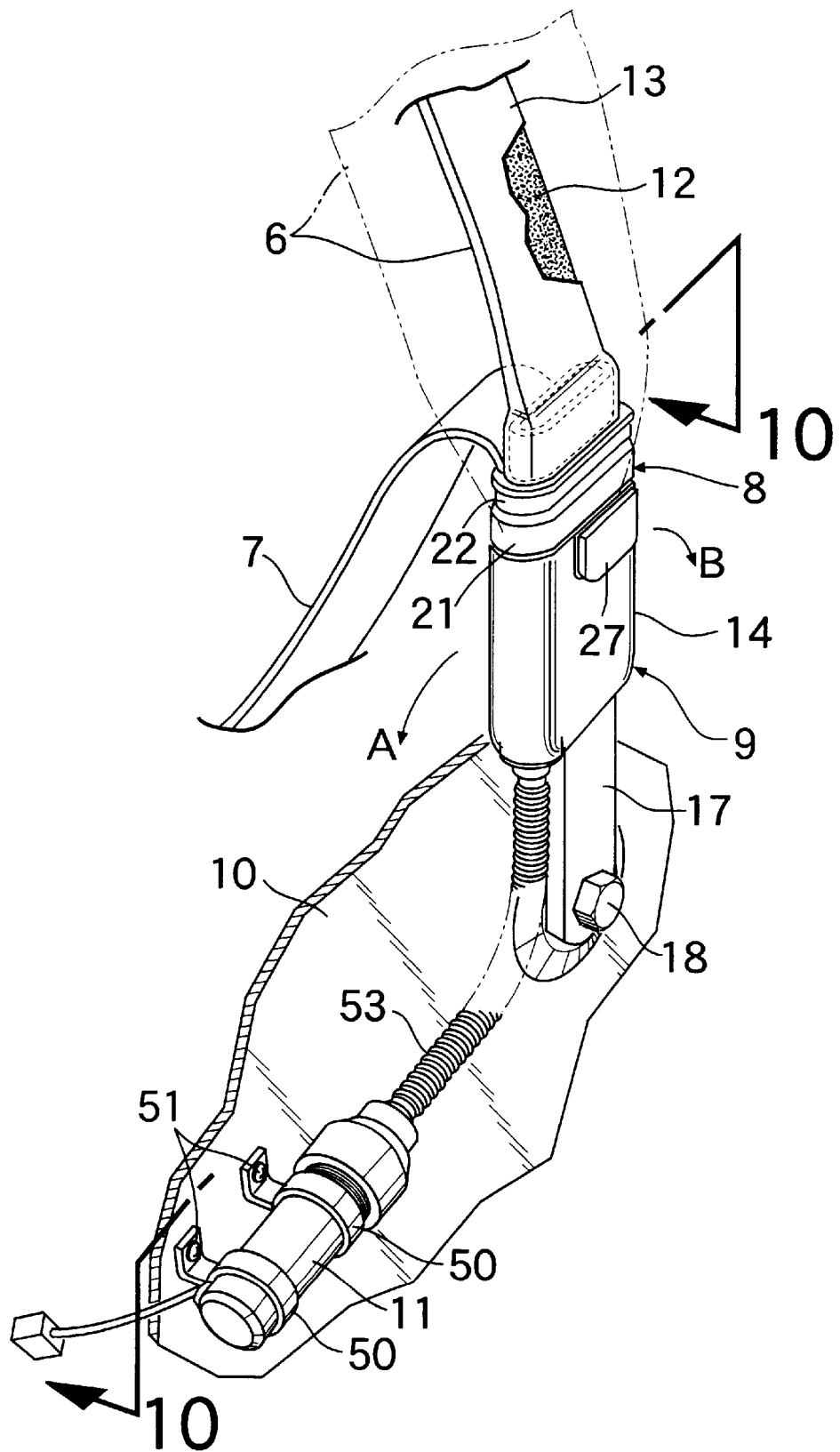
FIGS. 9 to 11 illustrate a fifth embodiment of the present invention, as follows.
Figure 10:
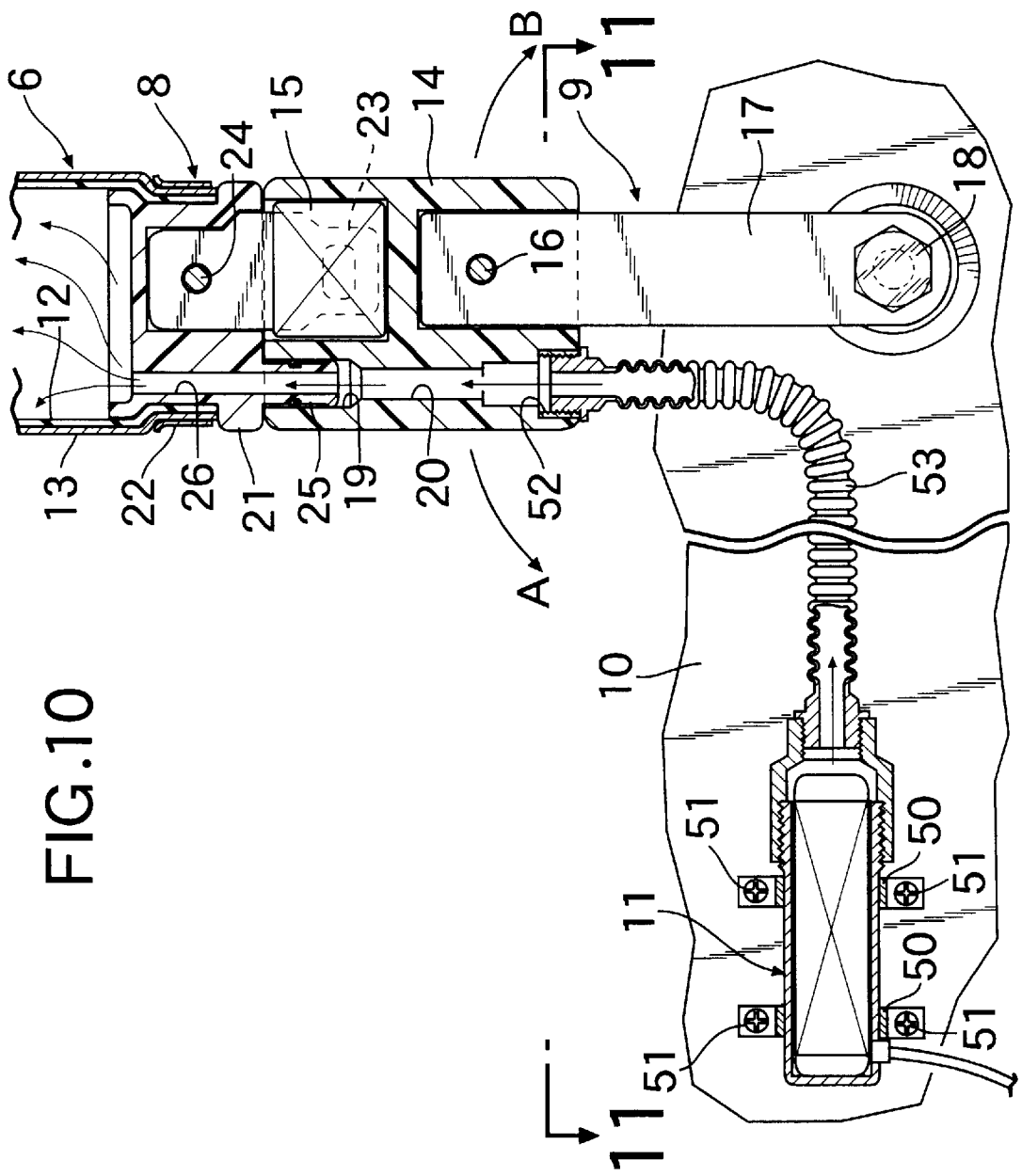
Figure 11:
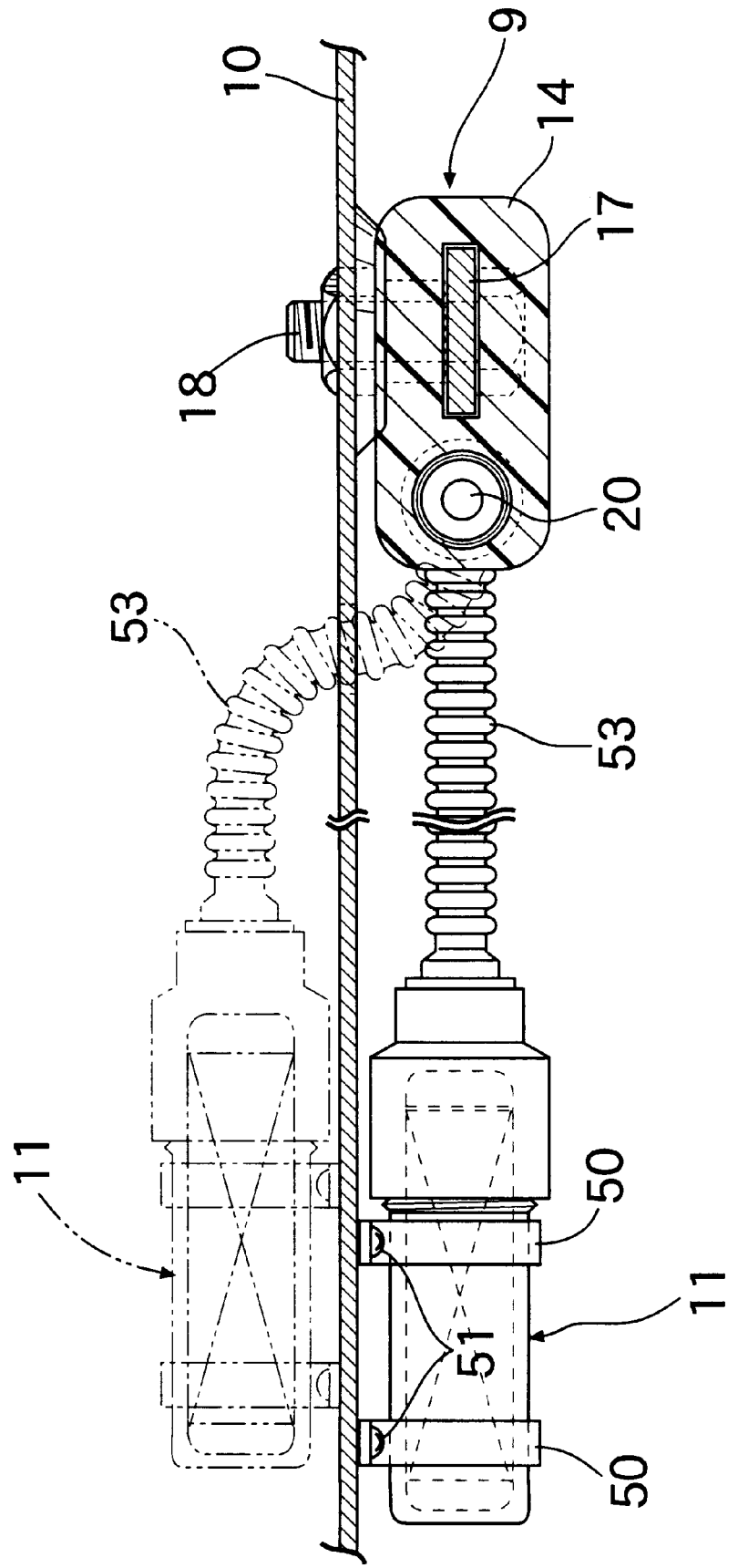

A fifth embodiment of the present invention will be described below with reference to FIGS. 9 to 11.

The feature of the fifth embodiment resides in the connection between the buckle assembly 9 and the inflator 11, and the shoulder belt 6, the lap belt 7, the tongue device 8 and the buckle assembly 9 are substantially identical in structure to those of each of the first to fourth embodiments.

The inflator 11 is fixed to a side surface of the seat base 10 by two mounting bands 50 and 50, fitted on the periphery of the inflator 11, and two bolts 51 and 51, which are inserted through the respective mounting bands 50 and 50. The inflator 11 and a gas introducing port 52, which is formed at the bottom of the buckle housing 14, are connected by a flexible pipe 53 which can be bent. For example, a bellows pipe made of metal or a pressure hose may be used as the flexible pipe 53. In the fifth embodiment, if the angle of the shoulder belt 6 and the lap belt 7 varies according to the forward or rearward position of the seat 1 or the shape of the body of the seat occupant, the tongue device 8, connected to the shoulder belt 6 and the lap belt 7, swings about the pivot pin 18 together with the buckle assembly 9 in a direction A or B as viewed in each of FIGS. 9 and 10, thereby compensating for the variation in such angle.

If the acceleration sensor detects an acceleration of not less than a predetermined value at the time of a collision of the vehicle, the inflator 11 ignites and produces a high-pressure gas in response to an ignition command from an ignition controller, and the high-pressure gas is supplied to the bag 12 of the shoulder belt 6 through the flexible pipe 53, the gas introducing port 52, the gas passage 20, and the connection port 19 of the buckle housing 14 and the connection pipe 25, and the gas passage 26 of the tongue housing 21. Accordingly, as the shoulder belt 6 is expanded, the area of contact with the chest of the seat occupant increases compared with the shoulder belt 6 which does not yet expand, so that the seat occupant can be restrained far more gently.

As described above, since the inflator 11 connected to the buckle assembly 9 via the flexible pipe 53 is non-swingably fixed to the seat base 10, even if the buckle assembly 9 swings, the inflator 11 has no risk of interfering with another member. Accordingly, the degree of freedom of design can be increased.

In the description of the fifth embodiment, the center pillar 2 is illustrated as a fixed portion to which one end of the shoulder belt 6 is connected, and the seat base 10 is illustrated as a fixed portion on which the buckle assembly 9 and the inflator 11 are supported, but such fixed portions are not limited to those of the fifth embodiment. The inflator 11 may be fixed to the inside surface of the seat base 10 as shown by chain double-dashed lines in FIG. 11, instead of being fixed to the outside surface of the seat base 10. This arrangement makes it possible to achieve effective use of space and an improvement in external appearance at the same time.

A sixth embodiment of the present invention will be described below with reference to FIGS. 12 and 13A to 13C.

Figure 12:
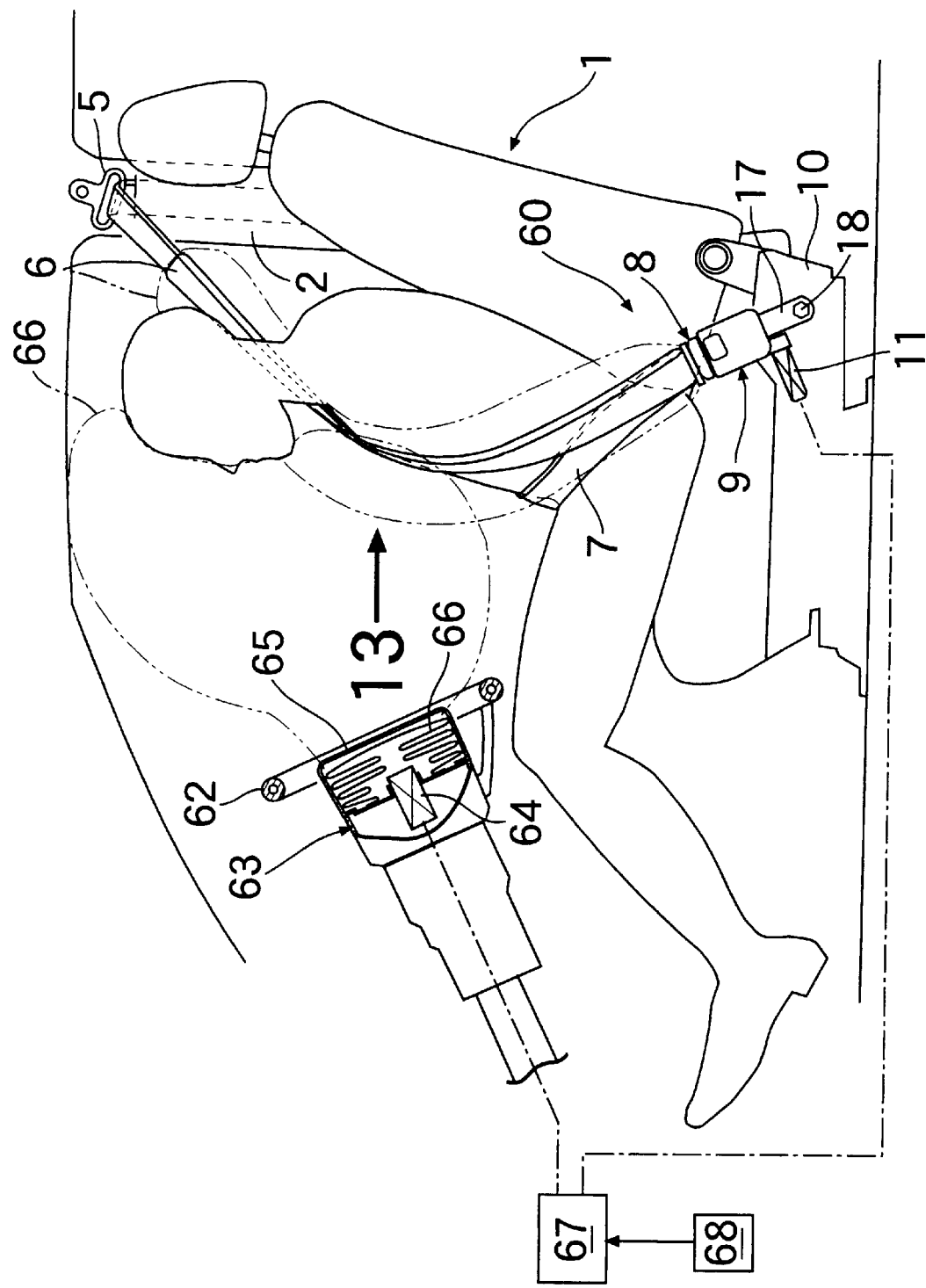
Figure 14:
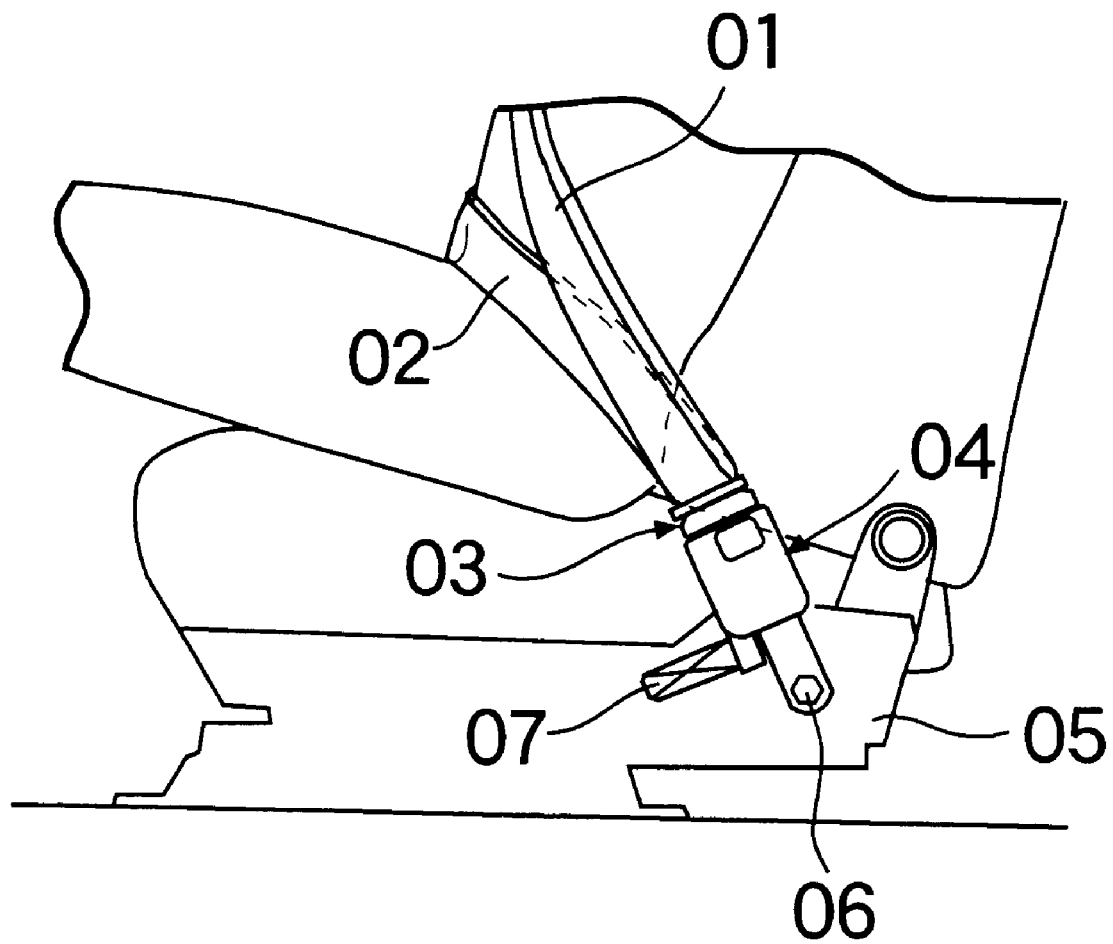
FIG. 14 is an explanatory view of a conventional air bag assembly.

As shown in FIG. 12, an air bag assembly 63 is provided in the inside of a steering wheel 62 so that a driver sitting in the seat 1 is restrained at the time of a collision of the vehicle. The air bag assembly 63 includes: an air bag inflator 64, which produces a high-pressure gas at the time of a collision of the vehicle, and an air bag 66, which is expanded by the high-pressure gas produced by the air bag inflator 64 and breaks a cover 65 of the steering wheel 62 to expand into the chamber of the vehicle. An ignition controller 67 controls the ignition of the air bag inflator 64 on the basis of a signal from an acceleration sensor 68, which detects an acceleration occurring due to the collision of the vehicle. The ignition controller 67 constitutes control means of the present invention, and the acceleration sensor 68 constitutes shock detecting means of the present invention.

An air belt assembly 60, which restrains the driver in the seat 1, is substantially identical to the corresponding one of each of the above-described first to fifth embodiments, and the description thereof is omitted.

An acceleration which is detected by the acceleration sensor 68 at the time of a collision of the vehicle is inputted to the ignition controller 67, and the ignition controller 67 calculates the magnitude of the shock of the collision by integrating the acceleration over a preset time, and the magnitude of the shock is compared with a first threshold and a second threshold, both of which are stored in advance. The first threshold corresponds to, for example, the magnitude of a shock which occurs when the vehicle collides head-on against a rigid wall at 16 km/h, while the second threshold corresponds to, for example, the magnitude of a shock which occurs when the vehicle collides head-on against a rigid wall at 24 km/h.

If the calculated magnitude of the shock is less than the first threshold, the driver can be fully protected with a normal seat belt and therefore, the ignition controller 67 does not output an ignition signal to either of the air bag inflator 64 and the air belt inflator 11. Accordingly, as shown in FIG. 13A, the air bag 66 of the air bag assembly 63 is not expanded, and the shoulder belt 6 of the air belt assembly 60 is not expanded, either, whereby the seat occupant is restrained in the seat 1 by the lap belt 7, of the air belt assembly 60, and the shoulder belt 6, which is not expanded. In this manner, if the shock of the collision is small, the ignition of the air bag inflator 64 and that of the air belt inflator 11 are both inhibited, whereby the replacement costs of the air bag assembly 63 and the air belt assembly 60 can be reduced to ease an economic burden on the user.

When the calculated magnitude of the shock is not less than the first threshold and less than the second threshold, if the air belt assembly 60 is operated, it is possible to fully restrain the seat occupant without operating the air bag assembly 63, so that the ignition controller 67 does not output an ignition signal to the air bag inflator 64, but outputs an ignition signal to only the air belt inflator 11. Accordingly, as shown in FIG. 13B, the air bag 66 of the air bag assembly 63 is not expanded, and only the shoulder belt 6, of the air belt assembly 60, is expanded to gently restrain the seat occupant in the seat 1. In this manner, if the magnitude of the shock of the collision is not too great, only the air belt assembly 60 is operated and an unnecessary operation of the air bag assembly 63 is avoided, whereby the replacement cost of the air bag assembly 63 can be reduced to ease an economic burden on the user.

When the calculated magnitude of the shock is not less than the second threshold, it is necessary to operate both the air bag assembly 63 and the air belt assembly 60 to produce the maximum restraining force, so that the ignition controller 67 outputs ignition signals to both the air bag inflator 64 and the air belt inflator 11. Accordingly, as shown in FIG. 13C, the air bag 66 of the air bag assembly 63 and the shoulder belt 6 of the air belt assembly 60 are both expanded so that a seat-occupant restraining force can be increased to the maximum by the cooperation between the expanded air bag 66 and the expanded shoulder belt 6.

In this manner, since either or both of the air bag assembly 63 and the air belt assembly 60 are selected and operated according to the magnitude of the shock of collision, it is possible to produce necessary and sufficient restraining force at a minimum cost.

Incidentally, although the description of the sixth embodiment has referred to the air bag assembly 63 for a driver's seat, the present invention can also be applied to an air bag assembly for the seat next to the driver. As a method of detecting the shock of collision, it is possible to adopt an arbitrary method other than the above-described embodiments.

We claim:

1. A seat-occupant restraining apparatus comprising:

an air bag inflator, which produces a high-pressure gas; an air bag, which is expanded by said high-pressure gas produced by said air bag inflator, and expands in front of a seat occupant sitting in a seat; an air belt inflator which produces a high-pressure gas; an air belt, which is expanded by said high-pressure gas produced by said air belt inflator in the state of restraining said seat occupant in said seat; shock detecting means for detecting a shock of a collision of a vehicle; and control means for controlling an operation of said air bag inflator and an operation of said air belt inflator on a basis of an output of said shock detecting means, wherein if a shock, detected by said shock detecting means, is less than a first threshold, said control means does not operate any one of said air bag inflator and said air belt inflator, wherein if said shock is not less than said first threshold and is less than a second threshold, greater than said first threshold, said control means does not operate said air bag inflator, but does operate said air belt inflator, and wherein if said shock is not less than said second threshold, said control means operates both said air bag inflator and said air belt inflator.

* * * * *